US011972179B2

(12) United States Patent
Baek et al.

(10) Patent No.: US 11,972,179 B2
(45) Date of Patent: Apr. 30, 2024

(54) METHOD OF SIMULATING QUANTUM COMPUTING SYSTEM AND QUANTUM COMPUTING SIMULATION SYSTEM

(71) Applicant: ELECTRONICS AND TELECOMMUNICATIONS RESEARCH INSTITUTE, Daejeon (KR)

(72) Inventors: Chungheon Baek, Daejeon (KR); Byung-Soo Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 670 days.

(21) Appl. No.: 16/924,522

(22) Filed: Jul. 9, 2020

(65) Prior Publication Data

US 2021/0012045 A1   Jan. 14, 2021

(30) Foreign Application Priority Data

Jul. 10, 2019  (KR) .................. 10-2019-0083288
Apr. 8, 2020  (KR) .................. 10-2020-0042498

(51) Int. Cl.
*G06N 10/00* (2022.01)
*G06F 30/20* (2020.01)
*G06F 119/02* (2020.01)
*G06F 119/12* (2020.01)

(52) U.S. Cl.
CPC .......... *G06F 30/20* (2020.01); *G06N 10/00* (2019.01); *G06F 2119/02* (2020.01); *G06F 2119/12* (2020.01)

(58) Field of Classification Search
CPC .. G06F 30/20; G06F 2119/12; G06F 2111/10; G06N 10/00
See application file for complete search history.

(56) References Cited

U.S. PATENT DOCUMENTS 10,171,088 B1   1/2019 Kim et al.
11,288,121 B2*  3/2022 Katabarwa ............ H03M 13/47
(Continued)

FOREIGN PATENT DOCUMENTS

WO   2018062991 A1   4/2018

OTHER PUBLICATIONS

Baek et al. Density-Matrix Simulation of Logical Qubit Using 3-qubit Quantum Error Correction Code Oct. 2018 (Year: 2018).*
(Continued)

*Primary Examiner* — Rehana Perveen
*Assistant Examiner* — Cuong V Luu
(74) *Attorney, Agent, or Firm* — Rabin & Berdo, P.C.

(57) ABSTRACT

Provided is a method of simulating a quantum computing system having an error correction function. The method includes generating a quantum information density matrix, generating a coded density matrix by performing quantum error correction coding on the quantum information density matrix, applying quantum computing to the coded density matrix and calculating a change in a first reliability of the coded density matrix, applying the quantum computing to the quantum information density matrix and calculating a change in a second reliability of the quantum information density matrix, and determining an operation time of the quantum computing, based on the change in the first reliability and the change in the second reliability.

19 Claims, 12 Drawing Sheets

(56) References Cited

U.S. PATENT DOCUMENTS

| | | |
|---|---|---|
| 2019/0049495 A1 | 2/2019 | Ofek et al. |
| 2019/0244128 A1* | 8/2019 | Choi et al. |
| 2020/0119748 A1* | 4/2020 | Lucarelli ............... H03M 13/11 |
| 2020/0274554 A1* | 8/2020 | Aspuru-Guzik ....... G06N 10/00 |

OTHER PUBLICATIONS

Steane A Tutorial on quantum Error Correction Proceedings of the International School of Physics (Year: 2006).*

Chungheon Baek et al., "Density-Matrix Simulation of Logical Qubit using 3-qubit Quantum Error Correction Code", arXiv:1810.01029v1 [quant-ph] Oct. 2, 2018, pp. 1-9.

IlKwon Sohn et al., "Analysis of physical requirements for simple three-qubit and nine-qubit quantum error correction on quantum-dot and superconductor qubits", Physical Review A 95, 012306, Jan. 6, 2017, pp. 1-7.

Muyuan Li et al., "Fault tolerance with bare ancillary qubits for a [[7,1,3]] code", Physical Review A 96, 032341, Sep. 28, 2017, pp. 1-10.

T. E. O'Brien et al., "Density-matrix simulation of small surface codes under current and projected experimental noise", npj Quantum Information, Sep. 25, 2017, 3:39, pp. 1-8.

Principal Investigator: Senior Researcher Byungsoo Choi et al., "Research and Development of Quantum Computing Platform and Its Cost-Effectiveness Improvement", Electronics and Telecommunications Research Institute, Jan. 2019.

* cited by examiner

FIG. 5
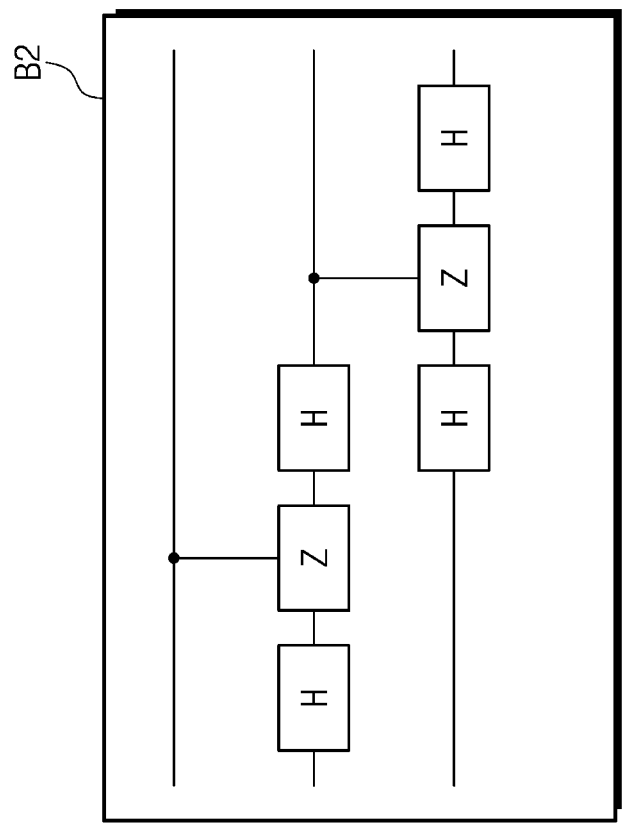
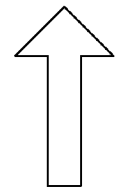
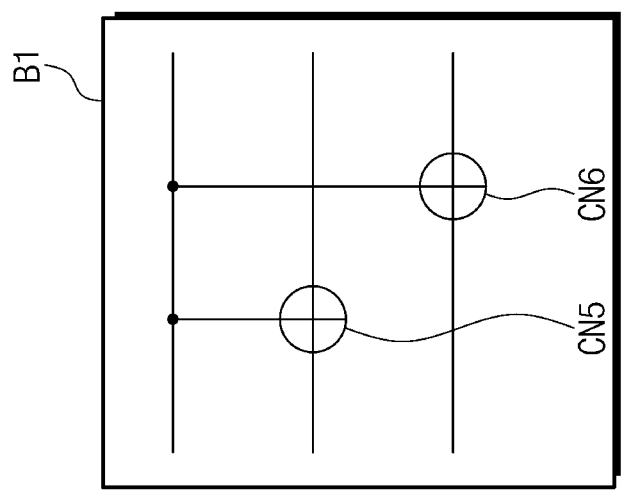

FIG. 6
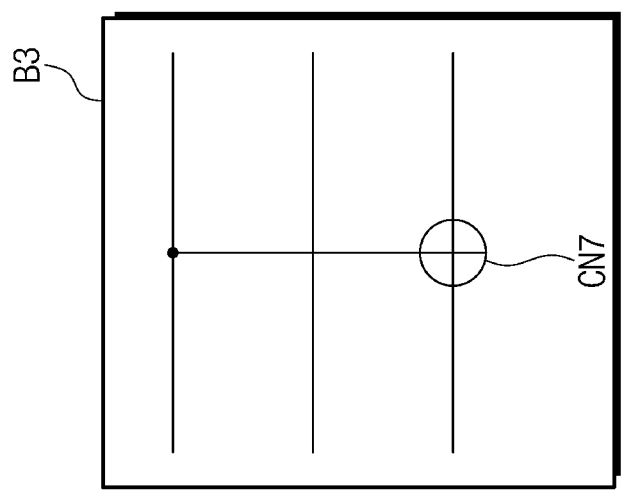
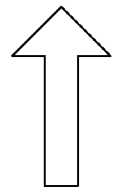
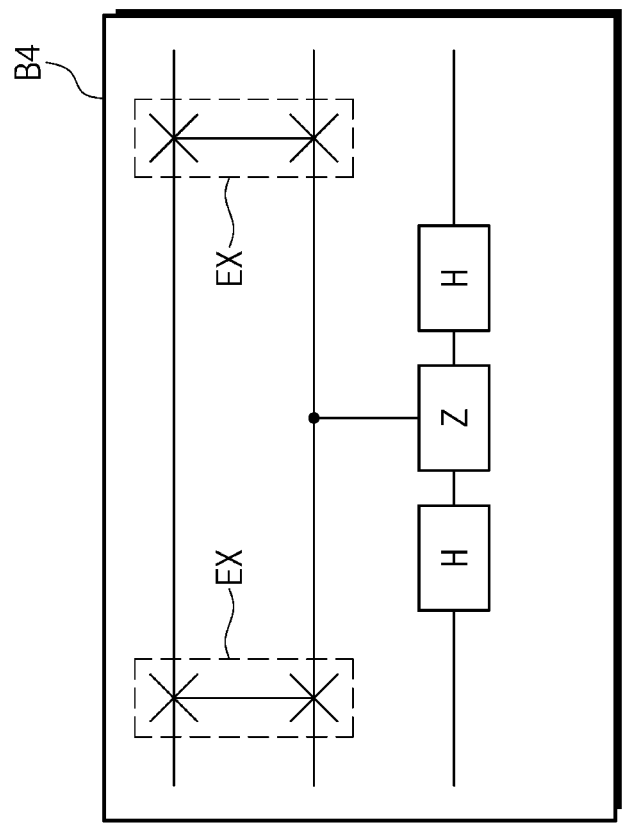

METHOD OF SIMULATING QUANTUM COMPUTING SYSTEM AND QUANTUM COMPUTING SIMULATION SYSTEM

CROSS-REFERENCE TO RELATED APPLICATIONS

This U.S. non-provisional patent application claims priority under 35 U.S.C. § 119 of Korean Patent Application Nos. 10-2019-0083288, filed on Jul. 10, 2019, and 10-2020-0042498, filed on Apr. 8, 2020, respectively, the entire contents of which are hereby incorporated by reference.

BACKGROUND

Embodiments of the inventive concept relate to a computing device, and more particularly, relate to a method of simulating a quantum computing system that determines an error correction decoding time and a quantum computing simulation system.

A quantum computing is researched and developed in various ways using superconductivity, ions, semiconductors, etc. In particular, the quantum computing has a potential to be applied to many applications such as a quantum machine learning, a quantum security, and a new drug development, and thus a need for research and development is increasing.

The quantum computing currently being studied includes a naturally occurring error, and therefore, a quantum error correction process capable of correcting the error is required. However, a performance of the quantum computing is not sufficiently improved to develop the quantum error correction, so the quantum computing is simulated using digital computers (e.g., supercomputers), and the quantum error correction is being developed.

SUMMARY

Embodiments according to the inventive concept provide a method of simulating a quantum computing system that calculates a time for performing a quantum error correction decoding and a quantum computing simulation system.

According to an embodiment of the inventive concept, a method of simulating a quantum computing system having an error correction function includes generating a quantum information density matrix, generating a coded density matrix by performing quantum error correction coding on the quantum information density matrix, applying quantum computing to the coded density matrix and calculating a change in a first reliability of the coded density matrix, applying the quantum computing to the quantum information density matrix and calculating a change in a second reliability of the quantum information density matrix, and determining an operation time of the quantum computing, based on the change in the first reliability and the change in the second reliability.

According to an embodiment, the calculating of the change in the first reliability may include calculating the change in the first reliability of the coded density matrix in units of a unit time.

According to an embodiment, the quantum computing may include the operation of two or more quantum gates, and the unit time may be less than a respective operation time of the quantum gates.

According to an embodiment, the calculating of the change in the first reliability of the coded density matrix in units of the unit time may include applying an error of the unit time by the quantum computing to the coded density matrix, and applying a naturally occurring quantum error of the unit time to the coded density matrix.

According to an embodiment, the applying of the error of the unit time by the quantum computing to the coded density matrix may include applying an error in an amplitude of the unit time by the quantum computing to the coded density matrix, and applying an error in a phase of the unit time by the quantum computing to the coded density matrix.

According to an embodiment, the applying of the naturally occurring quantum error of the unit time to the coded density matrix may include applying an error in a naturally occurring amplitude of the unit time to the coded density matrix, and applying an error in the naturally occurring phase of the unit time to the coded density matrix.

According to an embodiment, the calculating of the change in the second reliability may include calculating the change in the second reliability of the quantum information density matrix in units of a unit time.

According to an embodiment, the determining of the operation time of the quantum computing, based on the change in the first reliability and the change in the second reliability may include detecting singularities based on a change in a difference between the first reliability and the second reliability, and determining the operation time based on the singularities.

According to an embodiment, the detecting of the singularities may include detecting at least two singularities in which the difference between the first reliability and the second reliability is less than a threshold.

According to an embodiment, the detecting of the singularities may further include, when a second singularity is detected after a first singularity is detected, ignoring the second singularity when a time difference between the first singularities and the second singularities is less than or equal to a threshold.

According to an embodiment, the determining of the operation time may include determining a time for which the first reliability is highest among the singularities as the operation time.

According to an embodiment, the determining of the operation time may include determining a time belonging to the singularities as the operation time.

According to an embodiment, the detecting of the singularities may include comparing of changes of a difference in the first reliability and a difference in the second reliability in units of a reference operation time, and detecting the singularities, based on the comparison in units of the reference operation time.

According to an embodiment, the quantum computing may include two or more quantum gates, and the determining of the operation time may include determining an accumulative operation time of the quantum gates in which the accumulative operation time belongs to a time period between the singularities, among the two or more quantum gates, as the operation time.

According to an embodiment of the inventive concept, a method of simulating a quantum computing system having an error correction function includes generating a quantum information density matrix, applying a selected one quantum gate to the quantum information density matrix in units of a unit time, sequentially selecting quantum gates and applying the selected quantum gate to the quantum information density matrix in units of the unit time, and calculating a change in reliability of the unit time of the quantum information density matrix as the quantum gates are applied.

According to an embodiment, the method may further include generating a coded density matrix by performing error correction coding on the quantum information density matrix, sequentially selecting the quantum gates and applying the selected quantum gate to the coded density matrix in units of the unit time, and calculating a change in a decoded reliability in units of the unit time to a quantum coded matrix as the quantum gates are applied.

According to an embodiment, the method may further include determining a time at which decoding is performed on the coded density matrix, based on the change in the reliability and the change in the decoded reliability.

According to an embodiment, the time is determined based on a unit of the operation time of each of the quantum gates.

According to an embodiment of the inventive concept, a quantum computing simulation system includes a coding module that receives a quantum information density matrix, quantum information, and quantum error correction coding information, and performs error correction coding on the quantum information, based on the quantum error correction coding information to generate coded quantum information, a memory module that performs quantum computing by applying quantum gates to the coded quantum information in units of a unit time and by applying the quantum gates to the quantum information in units of the unit time, an error correction module that generates decoded quantum information by performing error correction on the coded quantum information to which the quantum gates are applied, in units of the unit time, and an evaluation module that calculates a change in a first reliability of the decoded quantum information in units of the unit time, and calculates a change in a second reliability of the quantum information to which the quantum gates are applied, in units of the unit time.

According to an embodiment, the evaluation module may be further configured to determine an operation time to which the quantum gates are applied to the coded quantum information, based on a change in a difference between the first reliability and the second reliability.

BRIEF DESCRIPTION OF THE FIGURES

The above and other objects and features of the inventive concept will become apparent by describing in detail exemplary embodiments thereof with reference to the accompanying drawings.

FIG. 5 is a diagram illustrating a first example in which a quantum gate mapping is performed.

FIG. 6 is a diagram illustrating a second example in which a quantum gate mapping is performed.

DETAILED DESCRIPTION

Hereinafter, embodiments of the inventive concept will be described clearly and in detail such that those skilled in the art may easily carry out the inventive concept.

Figure 1:
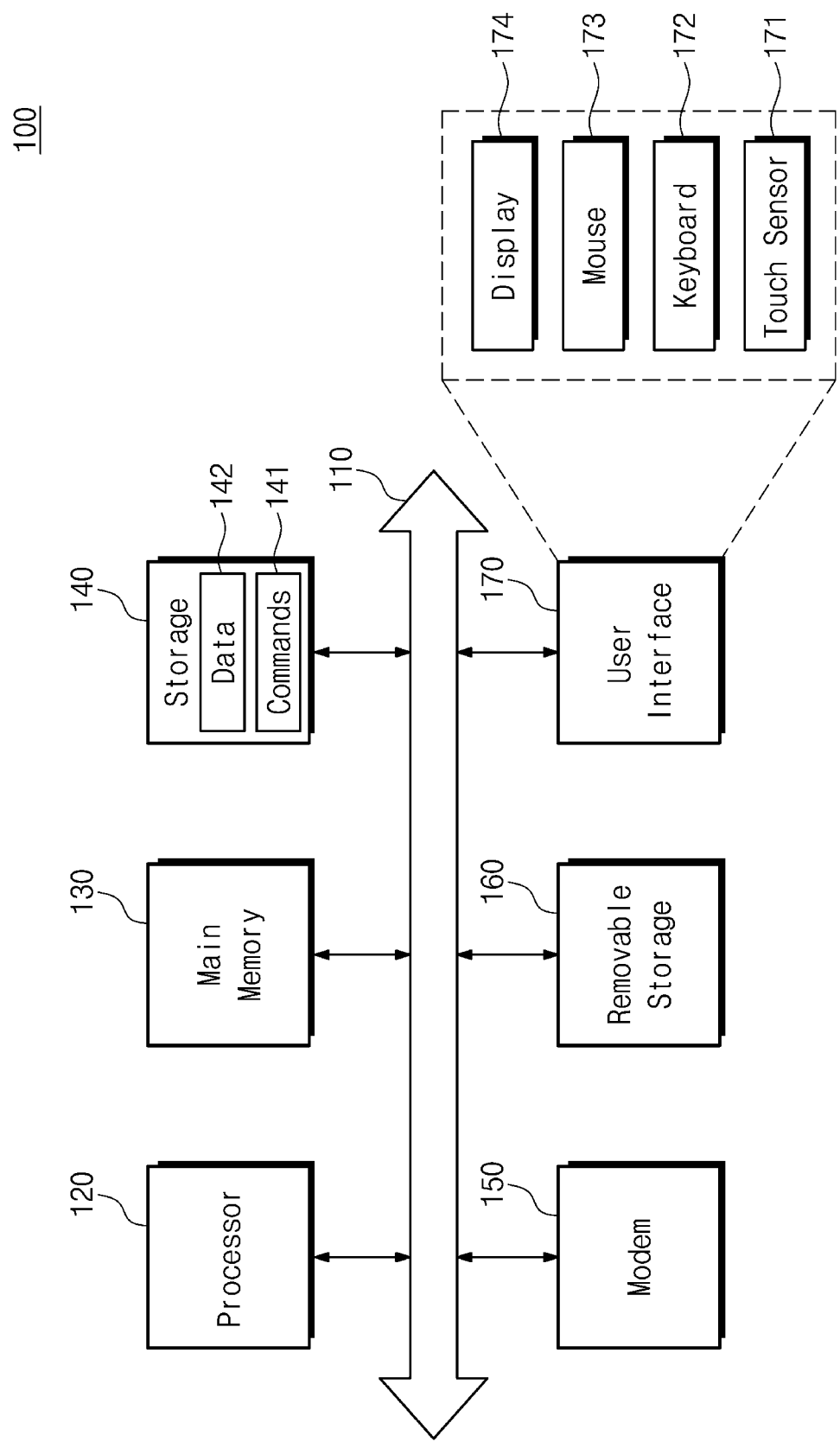
FIG. 1 is a block diagram illustrating a computing device according to an embodiment of the inventive concept.

FIG. 1 is a block diagram illustrating a computing device 100 according to an embodiment of the inventive concept. Referring to FIG. 1, the computing device 100 includes a bus 110, a processor 120, a main memory 130, storage 140, a modem 150, removable storage 160, and a user interface 170. The bus 110 provides a channel among components of the computing device 100.

The processor 120 may control the computing device 100 and may implement (or execute) a quantum computing simulation system to perform a quantum computing simulation. For example, the processor 120 may execute a tool for the quantum computing simulation by executing commands 141 stored in the storage 140. The processor 120 may implement (or execute) the quantum computing simulation system by reading data stored in the storage 140 and applying the read data to a tool.

The main memory 130 may be an operating memory of the processor 120. The main memory 130 may temporarily store commands or data required by the processor 120 among the commands 141 and data 142 stored in the storage 140. The main memory 130 may include high-speed random access memory such as a DRAM, a PRAM, an MRAM, and an RRAM, or a storage class memory (SCM).

The storage 140 may be used as a secondary memory of the computing device 100. The storage 140 may store the commands 141 constituting the tool for the quantum computing simulation and the data 142 for the quantum computing simulation system. The storage 140 may include a hard disk drive (HDD), a solid state drive (SSD), an optical disk drive (ODD), etc.

The modem 150 may communicate with an external device wiredly or wirelessly. For example, the commands 141 or the data 142 may be stored in storage 140 through modem 150 from the external device. The commands 141 or the data 142 stored in the storage 140 may be transferred to the external device through the modem 150. The modem 150 may be based on Ethernet.

The removable storage 160 may include portable storage. For example, the commands 141 or the data 142 may be moved from the removable storage 160 to the storage 140. The commands 141 or the data 142 stored in the storage 140 may be transferred to the removable storage 160. The removable storage 160 may be based on one of various standards such as a Universal Serial Bus (USB), a Serial Advanced Technology Attachment (SATA), etc.

The user interface 170 may include various user input interface devices such as a touch sensor 171, a keyboard 172, a mouse 173, etc. The user interface 170 may receive execution commands of the tool for a simulation and various commands for simulation functions of the tool from the user.

The user interface 170 may include various user output interface devices, such as a display 174. The user interface 170 may transfer the tool for the quantum computing simulation, the quantum computing simulation system, and processes and results of the quantum computing simulation to the user.

Exemplarily, the computing device 100 may be implemented as a general purpose computer or a special purpose computer for the quantum computing simulation. The tools for the quantum computing simulation may be transferred through the modem 150 in a form of commands 141 or may be transferred through the removable storage 160. The data 142 for the quantum computing simulation may be transferred through the modem 150 or may be transferred through the removable storage 160.

Figure 2:
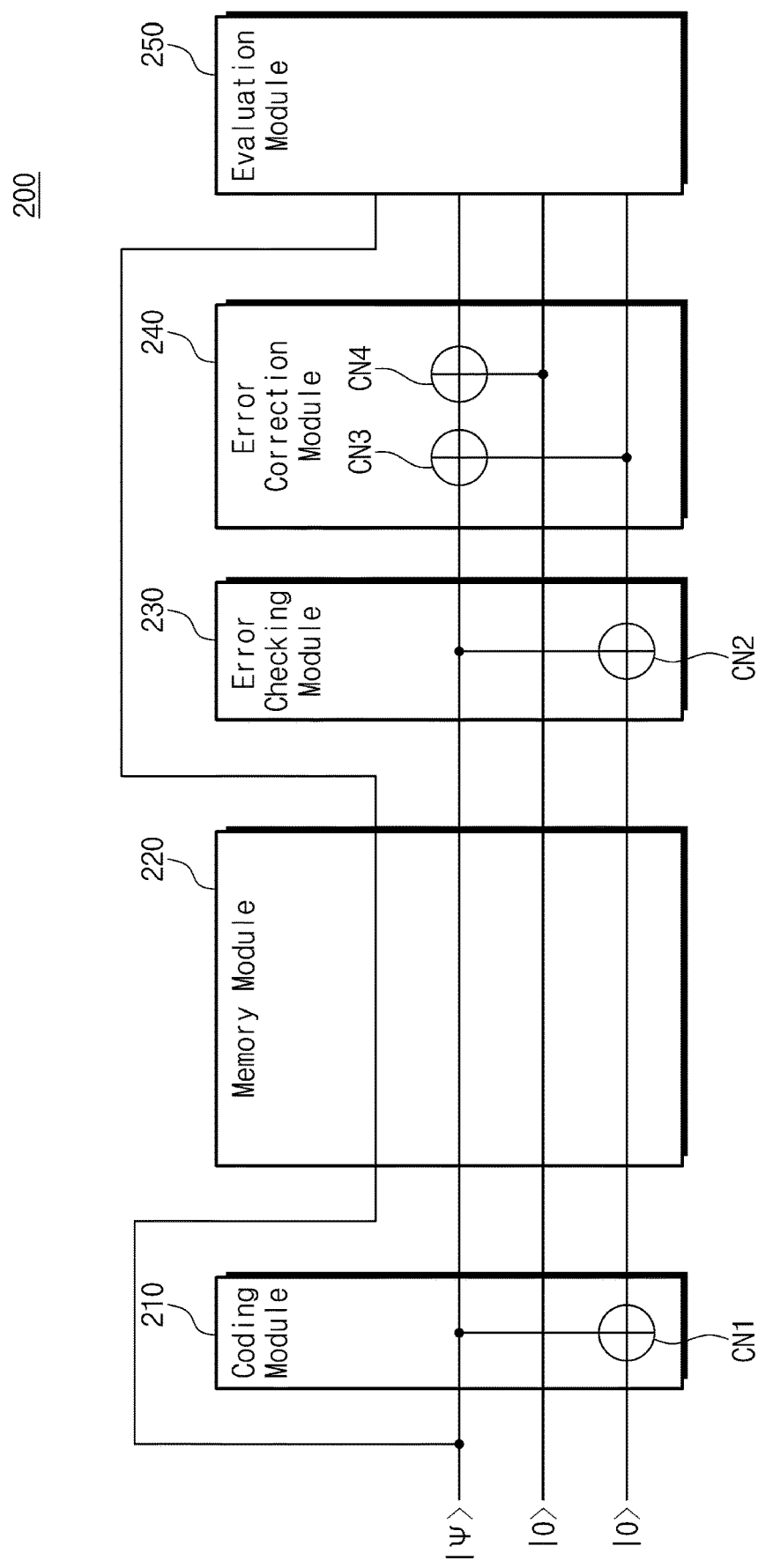
FIG. 2 is a block diagram illustrating a quantum computing simulation system that is implemented by a computing device of FIG. 1.

FIG. 2 is a block diagram illustrating a quantum computing simulation system 200 that is implemented by the computing device 100 of FIG. 1. Referring to FIG. 2, the quantum computing simulation system 200 may include a coding module 210, a memory module 220, an error checking module 230, an error correction module 240, and an evaluation module 250.

The coding module 210 may receive quantum information $|\psi\rangle$ and quantum error correction coding information $|0\rangle$. The coding module 210 may perform quantum error correction coding on the quantum information $|\psi\rangle$ by using the quantum error correction coding information $|0\rangle$.

For example, in the quantum computing simulation system 200, the quantum information $|\psi\rangle$ may be expressed in a form of a density matrix. The coding module 210 may output a coded density matrix as a result of the error correction coding.

Exemplarily, the coding module 210 is illustrated to include an operator of a first controlled not CN1, but a structure and a function of the coding module 210 are not limited thereto. The quantum computing simulation system 200 according to an embodiment of the inventive concept may perform a simulation and an evaluation on coding modules having various structures and functions.

The memory module 220 may perform quantum computing on qubits of the coded density matrix. For example, the quantum computing may include applying two or more quantum gates to a coded density matrix. The memory module 220 may also perform the quantum computing on the density matrix of the quantum information $|\psi\rangle$. The quantum gates applied to the density matrix of the quantum information $|\psi\rangle$ may be the same as quantum gates applied to the coded density matrix.

The error checking module 230 may check whether an error exists in the qubits of the density matrix that is coded and to which the quantum computing is applied in the memory module 220. In an error checking process, it is possible to determine types of errors that occur in a logical qubit of the coded density matrix and whether an error exists depending on the types of the errors.

In an embodiment, the error checking module 230 is illustrated to include the operator of a second controlled not CN2, but a structure and a function of the error checking module 230 are not limited thereto. The quantum computing simulation system 200 according to an embodiment of the inventive concept may perform the simulation and the evaluation on error checking modules having various structures and functions.

The error correction module 240 may perform quantum error decoding on the qubits of the density matrix that is coded and to which the quantum computing is applied in the memory module 220. The error correction module 240 may apply a quantum operation opposite to an error to each of the types of errors that is determined in the error checking process of the error checking module 230.

In an embodiment, the error correction module 240 is illustrated to include operators of a third controlled not CN3 and a fourth controlled not CN4, but a structure and a function of the error correction module 240 is not limited thereto. The quantum computing simulation system 200 according to an embodiment of the inventive concept may perform the simulation and the evaluation on error correction modules having various structures and functions.

In an embodiment, the error checking module 230 and the error correction module 240 may be integrated into one module.

The evaluation module 250 may calculate a change over time of a reliability (e.g., first reliability) of the density matrix decoded by the error correction module 240, and may calculate a change over time of a reliability (e.g., second reliability) of the density matrix of the quantum information $|\psi\rangle$ to which the quantum computing is applied in the memory module 220.

The evaluation module 250 may determine an operation time (or the number of the quantum gates) of the quantum computing of the memory module 220, based on a change in a difference between the first reliability and the second reliability. For example, the evaluation module 250 may perform the quantum computing in the memory module 220 and may determine a time (or timing) for performing an error correction by using the error correction module 240.

Figure 3:
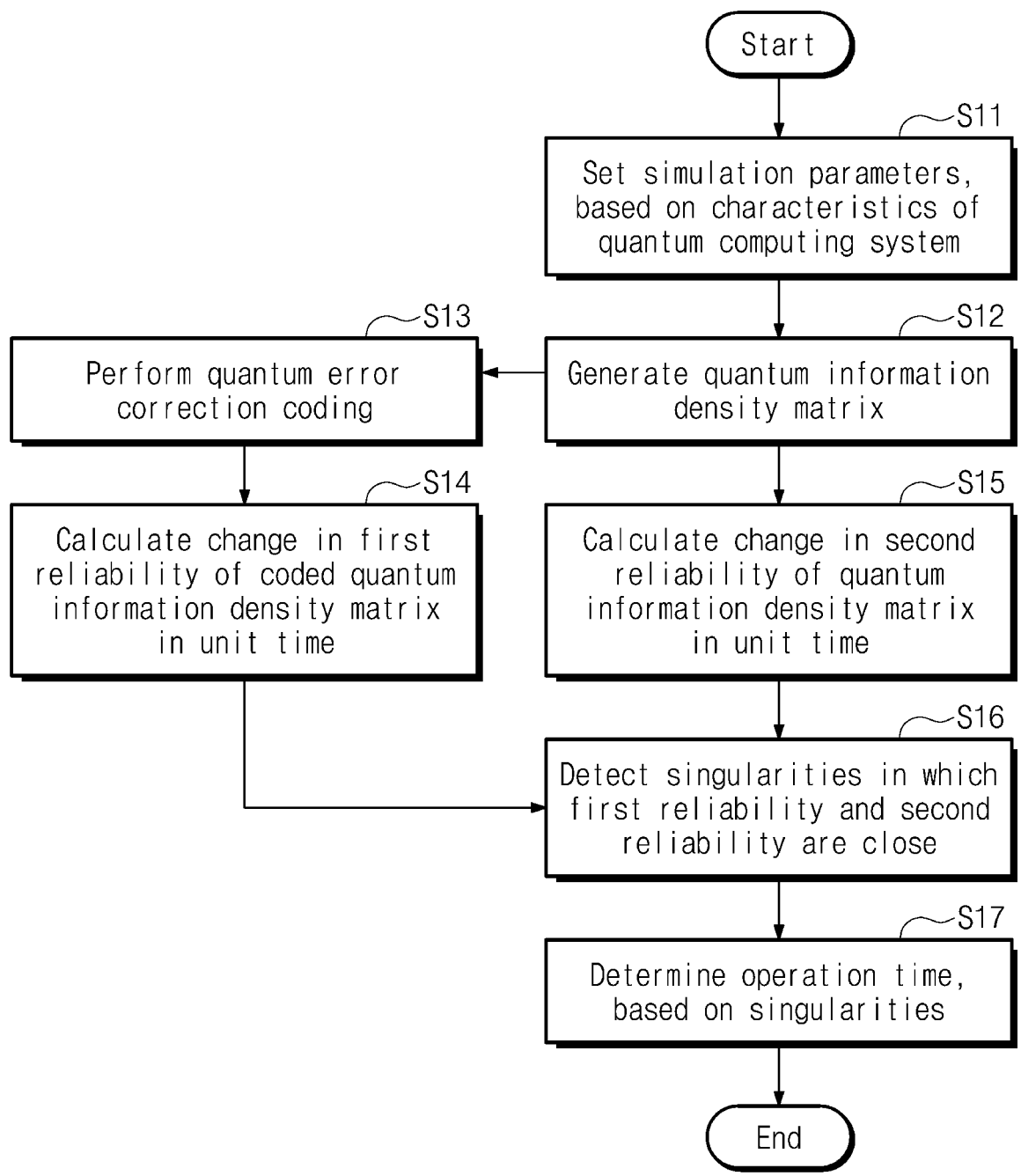
FIG. 3 is a flowchart describing an operating method of a quantum computing simulation system of FIG. 2.

FIG. 3 is a flowchart describing an operating method of the quantum computing simulation system 200 of FIG. 2. Referring to FIGS. 2 and 3, in operation S11, the quantum computing simulation system 200 may set simulation parameters, based on characteristics of a quantum computing system. For example, the quantum computing simulation system 200 may set parameters for performing the simulation from the characteristics (e.g., structural or functional) of the coding module 210, the memory module 220, the error checking module 230, and the error correction module 240, which are designated as a target of the simulation.

In operation S12, the quantum computing simulation system 200 may generate a quantum information density matrix. The quantum information $|\psi\rangle$ (or quantum state) may be expressed using a state vector as shown in Equation 1.

$$|\psi\rangle = \alpha|0\rangle + \beta|1\rangle, \ |\alpha|^2 + |\beta|^2 = 1 \qquad \text{[Equation 1]}$$

In Equation Equation 1, '$\alpha$' and '$\beta$' may be complex numbers.

The quantum information $|\psi\rangle$ may be expressed as a density matrix as shown in Equation 2.

$$\rho = |\psi\rangle\langle\psi| = (\alpha|0\rangle + \beta|1\rangle)(\alpha^*\langle0| + \beta^*\langle1|) \qquad \text{[Equatioin 2]}$$

Equation 2 may be expressed in a form of a matrix as shown in Equation 3.

$$\rho = \begin{bmatrix} \alpha\alpha^* & \alpha\beta^* \\ \alpha^*\beta & \beta\beta^* \end{bmatrix} \qquad \text{[Equation 3]}$$

When the density matrix is used, the quantum information $|\psi\rangle$ is represented by two dimensions of an amplitude and a phase. Therefore, the quantum information $|\psi\rangle$ may be expressed without loss, and the error may be calculated more precisely.

In operation S13, the coding module 210 may perform quantum error coding on the quantum information density matrix. In a quantum error correction coding process of the quantum computing, the quantum information |ψ⟩ may be distributed and spread. When the quantum error correction coding is performed, a state of '0' and a state of '1' of the quantum information |ψ⟩ may be distinguished from ground state. As a result of the quantum error correction coding, the '0', '1' of the quantum information |ψ⟩ or an overlapping state of the '0' and '1' is converted into logical '0', logical '1', or an overlapping state of the logical '0' and '1'.

In operation S14, the evaluation module 250 may calculate a change in the first reliability of the coded quantum information density matrix in units of a unit time (e.g., a micro time). For example, operation S14 may include repeating a process in which, when the unit time elapses, the error correction module 240 receives the density matrix that is coded and to which the quantum computing is applied, the error correction module 240 performs quantum error correction decoding, and the evaluation module 250 calculates the first reliability of the decoded density matrix.

In operation S15, the evaluation module 250 may calculate a change in the second reliability of the quantum information density matrix in units of the unit time. Operation S15 may include repeating a process in which, when the unit time elapses, the evaluation module 250 calculates the second reliability of the quantum information density matrix to which the quantum computing is applied.

In operation S16, the evaluation module 250 may detect singularities in which the first reliability and the second reliability are close. In operation S17, the evaluation module 250 may determine the operation time (or a time at which the error correction decoding is performed) of the memory module 220, based on the singularities.

Figure 4:
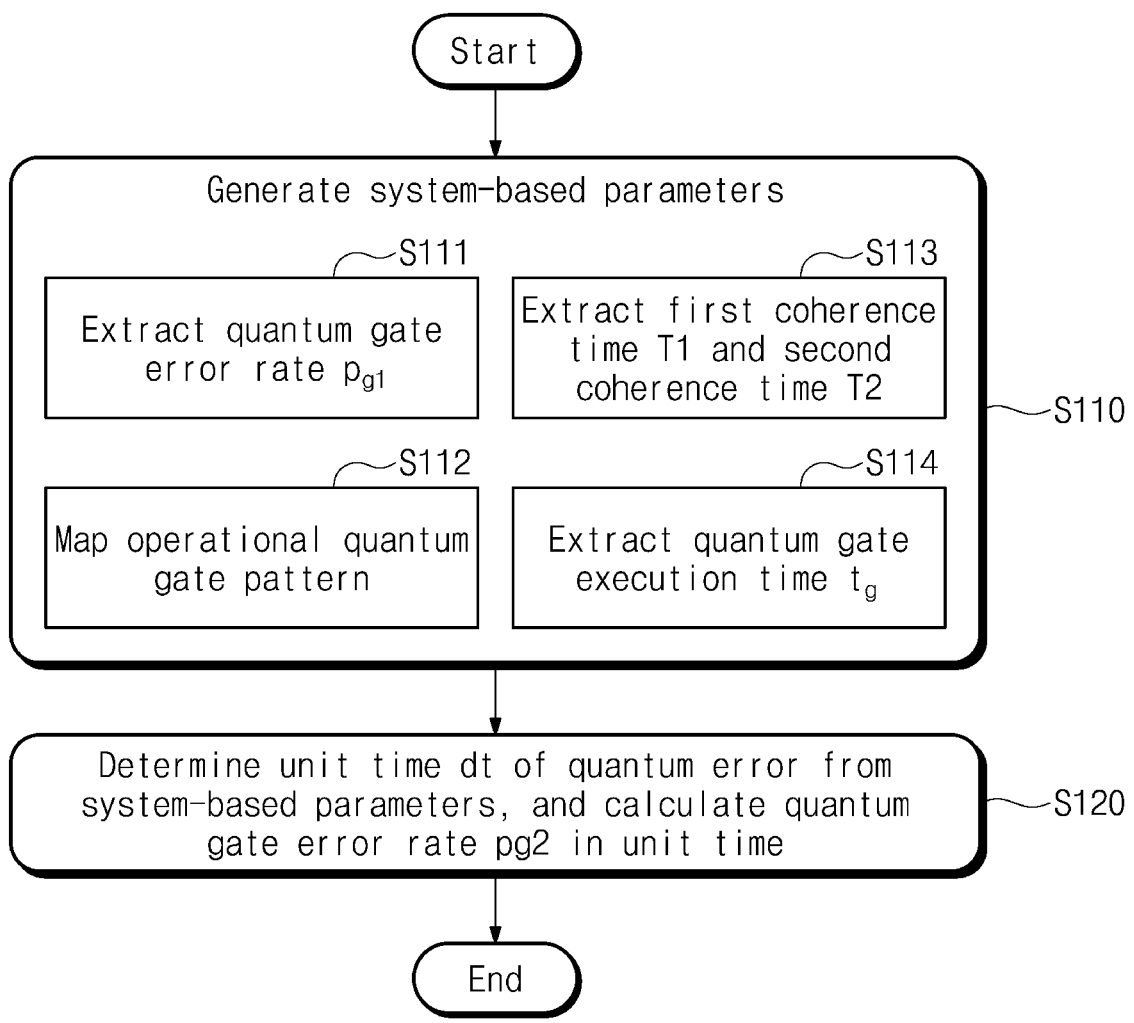
FIG. 4 is a flowchart describing operation S11 of FIG. 3 in more detail.

FIG. 4 is a flowchart describing operation S11 of FIG. 3 in more detail. Referring to FIGS. 2, 3 and 4, in operation S110, the quantum computing simulation system 200 may generate system-based parameters. Operation S110 may include operations S111 to S114. Operations S111 to S114 may be performed independently, in parallel, or sequentially.

In operation S111, the quantum computing simulation system 200 may extract a quantum gate error rate $p_{g1}$. The quantum gate error rate $p_{g1}$ may depend on the quantum computing that is supported by the memory module 220 of the quantum computing system to be simulated, for example, types of quantum gates. Different quantum gates may have different quantum gate error rates.

In operation S112, the quantum computing simulation system 200 may map an operational quantum gate pattern. For example, depending on the characteristics of the quantum computing system, the number of quantum gates supported by the memory module 220 may be limited. Based on the characteristics that other quantum gates are implemented using two or more quantum gates, the quantum computing simulation system 200 may map each of the quantum gates to be calculated by the memory module 220 to quantum gates supported by the memory module 220.

In operation S113, the quantum computing simulation system 200 may extract a first coherence time T1 and a second coherence time T2. The first coherence time T1 and the second coherence time T2 may determine an error rate of a naturally occurring quantum error. The first coherence time T1 may be a time that may maintain a coherence of the amplitude of the quantum information |ψ⟩. The second coherence time T2 may be a time that may maintain a coherence of the phase of the quantum information |ψ⟩.

In operation S114, the quantum computing simulation system 200 may extract a quantum gate execution time $t_g$. Execution times of the quantum gates may be different from one another. The quantum computing simulation system 200 may extract the execution times of quantum gates supported by the memory module 220.

Following operation S110, operation S120 may be performed. In operation S120, the quantum computing simulation system 200 may determine a unit time dt of quantum error from system-based parameters. The unit time dt may be a unit time that calculates error rates and reliabilities of the coded density matrix and the quantum information density matrix.

The unit time dt may be determined based on the first coherence time T1, the second coherence time T2, and the quantum gate execution time $t_g$. For example, the unit time dt may be determined to be shorter than each of the first coherence time T1, the second coherence time T2, and the quantum gate execution time $t_g$.

As the unit time dt becomes shorter, the operation time of the memory module 220 of the quantum computing simulation system 200 may be decreased, or resolution, accuracy, or reliability of time for the error correction decoding that is performed by the error correction module 240 may be improved. In contrast, as the unit time dt increases, resources (e.g., time, operating power, power, etc.) consumed by the quantum computing simulation system 200 may increase.

After the unit time dt is determined, a quantum gate error rate $p_{g2}$ in units of the unit time may be calculated from the quantum gate error rate $p_{g1}$. For example, a value obtained by dividing the execution time $t_g$ of each of the quantum gates by the unit time dt may be calculated. The quantum gate error rate $p_{g2}$ in units of the unit time may be calculated by applying a multiple square root corresponding to the calculated value to the quantum gate error rate $p_{g1}$.

FIG. 5 is a diagram illustrating a first example in which a quantum gate mapping is performed. Referring to FIGS. 2 and 5, a first block B1 shows an example of the quantum gates to be performed in the memory module 220. In the first block B1, the quantum gate of a fifth controlled not CN5 and the quantum gate of a sixth controlled not CN6 are exemplarily illustrated.

A second block B2 shows an example in which the quantum gates of the first block B1 are mapped. The quantum gate of the fifth controlled not CN5 and the quantum gate of the sixth controlled not CN6 may be mapped to a Hadamard gate (H), a Pauli-Z gate (Z), and the Hadamard gate (H), which are sequentially connected, respectively.

When the quantum gates of the second block B2 in the memory module 220 are applied to the quantum information density matrix, quantum gate errors of the Hadamard gate (H), the Pauli-Z gate (Z), and the Hadamard gate (H) may be sequentially applied to the qubits of the coded density matrix, respectively.

FIG. 6 is a diagram illustrating a second example in which a quantum gate mapping is performed. Referring to FIGS. 2 and 6, a third block B3 shows an example of quantum gates to be performed in the memory module 220. In the third block B3, the quantum gate of a seventh controlled not CN7 may be applied to the qubits that are not immediately adjacent to each other and thus cannot be entangled.

A fourth block B4 shows an example in which the quantum gate of the third block B3 is mapped. The quantum gate of the seventh controlled not CN7 may be mapped to the Hadamard gate (H), the Pauli-Z gate (Z), and the Hadamard gate (H), which are sequentially connected. Also, prior to the quantum gates mapped to the seventh controlled not CN7, by using an exchange gate EX, the quantum gates mapped to the seventh controlled not CN7 may be applied by exchanging a long-distance qubit that cannot be entangled and a short-distance qubit that can be entangled with each other.

After the operation of the quantum gate mapped to the seventh controlled not CN7 is finished, again, by using the exchange gate EX, the long-distance qubit that cannot be entangled and the short-distance qubit that can be entangled may be exchanged with each other. Thus, positions of the qubits may be restored.

When the quantum gates of the fourth block B4 in the memory module 220 are applied to the quantum information density matrix, the quantum gate errors of the exchange gate (EX), the Hadamard gate (H), the Pauli-Z gate (Z), the Hadamard gate (H), and the exchange gate (EX) may be applied to the qubits of the coded density matrix, respectively.

Figure 7:
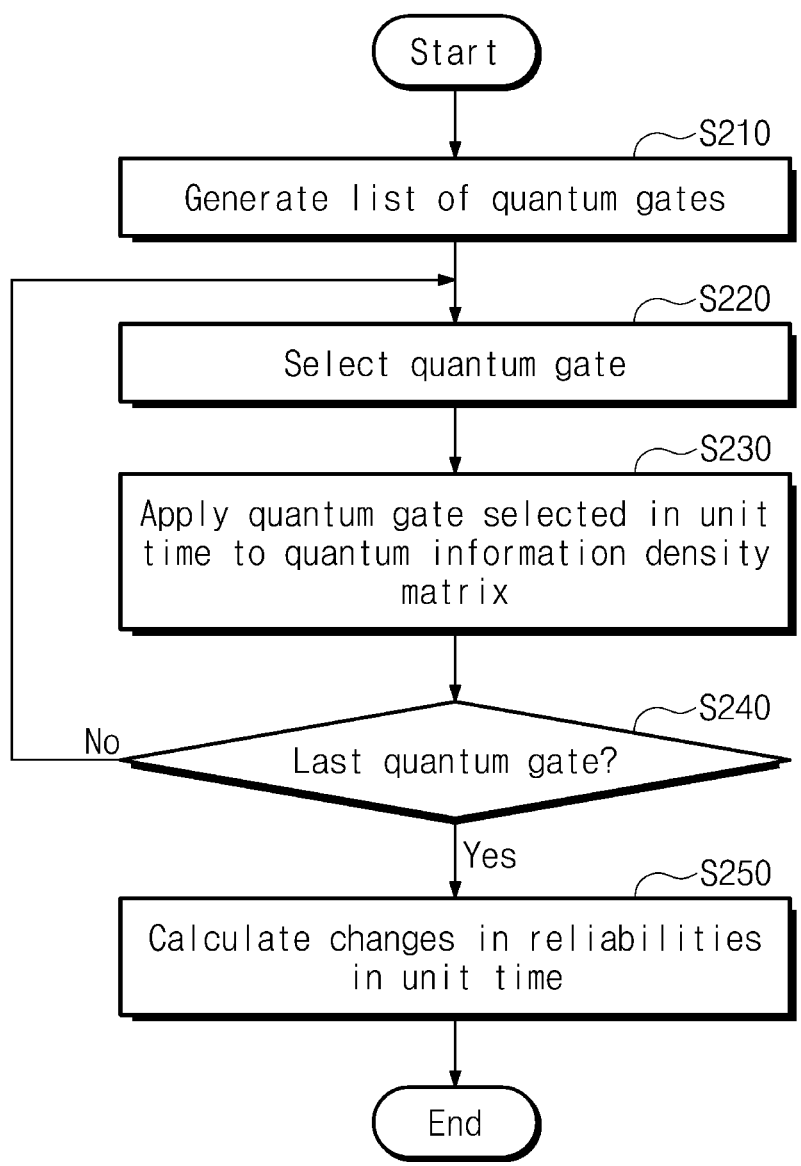
FIG. 7 is a flowchart describing operations S14 and S15 of FIG. 3 in more detail.

FIG. 7 is a flowchart describing operations S14 and S15 of FIG. 3 in more detail. For example, in operation S14, operations of FIG. 7 may be performed on the coded density matrix, and in operation S15, the operations of FIG. 7 may be performed on the quantum information density matrix.

Referring to FIGS. 2, 3 and 7, in operation S210, the quantum computing simulation system 200 may generate a list of quantum gates. For example, the list of quantum gates to be applied to the quantum information density matrix or the coded density matrix may be generated in the memory module 220.

In operation S220, the quantum computing simulation system 200 may select one of the quantum gates in the list. For example, the first quantum gate of the quantum gates of the list may be selected.

In operation S230, the quantum computing simulation system 200 may apply the quantum gate selected in operation S220 in units of the unit time dt to the quantum information density matrix (or coded density matrix). For example, the quantum computing simulation system 200 may apply the naturally occurring quantum error and a quantum gate error to the quantum information density matrix (or coded density matrix) when (or whenever) the unit time dt elapses.

Changing the quantum state may be defined by Equation 4.

$$\rho(t+\Delta t)=|\psi(t+\Delta t)\rangle\langle\psi(t+\Delta t)\rho(t)U^*(\Delta t) \quad \text{[Equation 4]}$$

In Equation 4, 'Δt' may indicate a passage of time. 'U (Δt)' is an operator representing the quantum gate error or the naturally occurring quantum error that occurs while the time of 'Δt' elapses, and is described in more detail below. 'U * (Δt)' may be a complex conjugate of 'U (Δt)'.

When operation S230 is performed, when the quantum gate is applied to the quantum information density matrix (or coded density matrix), information in which the error rate of the quantum information density matrix (or coded density matrix) varies in units of the unit time dt may be obtained.

When the operation (or application) of the selected quantum gate is completed, in operation S240, the quantum computing simulation system 200 may determine whether the selected quantum gate is a last quantum gate among the quantum gates in the list. When the selected quantum gate is not the last quantum gate, in operation S220, a subsequent quantum gate is selected, and operation S230 may be performed again.

When the selected quantum gate is the last quantum gate, operation S250 is performed. In operation S250, the quantum computing simulation system 200 may calculate changes in reliabilities in units of the unit time. For example, in operation S14, the quantum computing simulation system 200 may calculate changes in the first reliability of the coded density matrix in units of the unit time. The change in the first reliability may be calculated based on the change in the error rate of the coded density matrix.

Alternatively, in operation S15, the quantum computing simulation system 200 may calculate changes in the second reliability of the quantum information density matrix in units of the unit time. The change in the second reliability can be calculated based on the change in the error rate of the quantum information density matrix.

Figure 8:
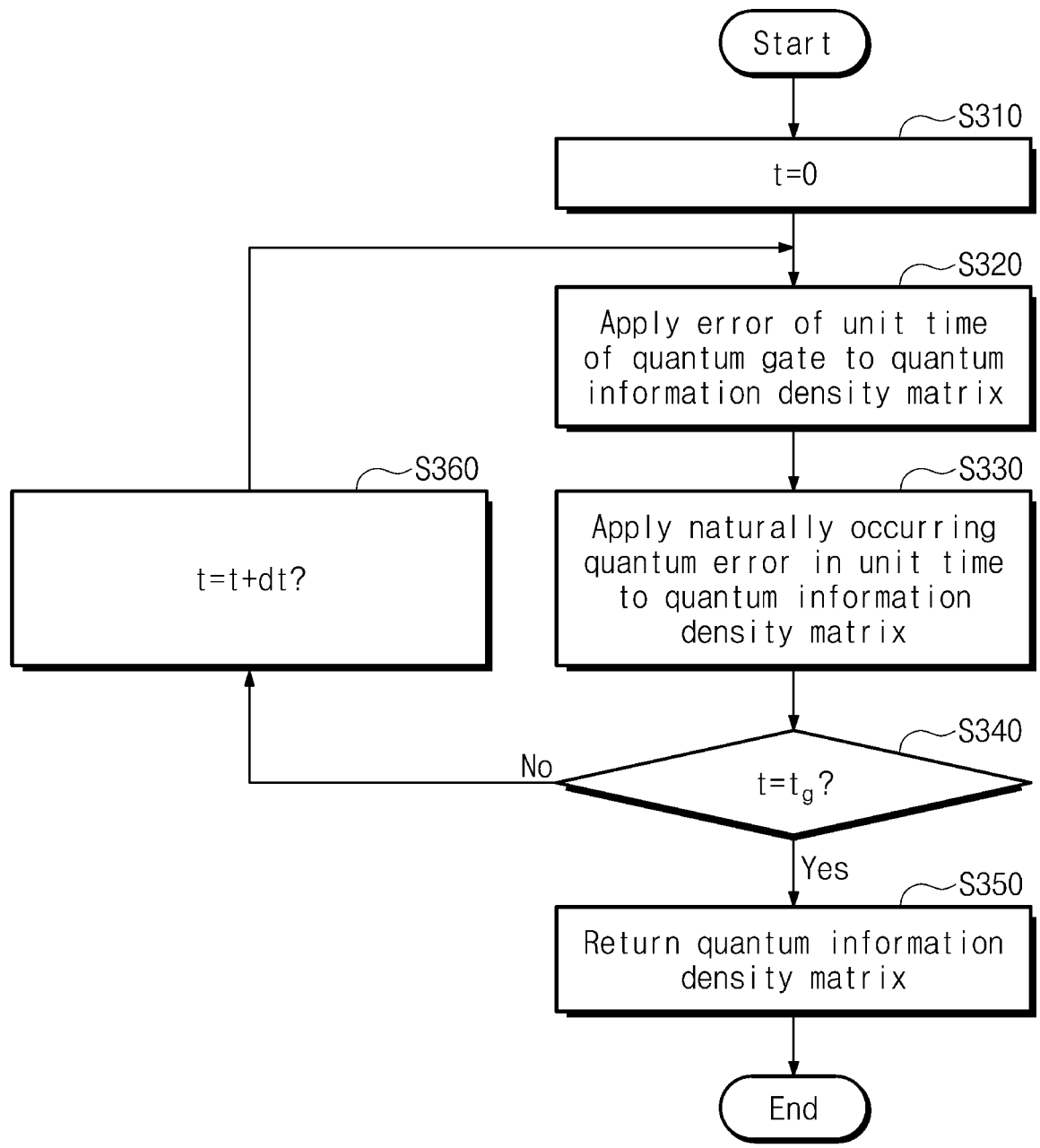
FIG. 8 is a flowchart describing operation S230 of FIG. 7 in more detail.

FIG. 8 is a flowchart describing operation S230 of FIG. 7 in more detail. Referring to FIGS. 2, 7 and 8, in operation S310, an arbitrary variable t indicating time may be initialized to '0'.

In operation S320, the error of the unit time of the quantum gate may be applied to the quantum information density matrix (or coded density matrix). The quantum gate error may be an error caused by inaccuracy in control when the quantum gate is applied to the quantum information $|\psi\rangle$ to control the quantum information $|\psi\rangle$. When the quantum gate is applied in the memory module 220, the operator when the error occurs may be defined by Equation 5.

$$E_0{}^{gate}=\sqrt{p_{g2}}I \quad \text{[Equation 5]}$$

In Equation 5, 'I' may be a unit matrix having a size corresponding to the selected quantum gate.

When the quantum gate is applied in the memory module 220, the operator when no error occurs may be defined by Equation 6.

$$E_1{}^{gate}=\sqrt{1-p_{g2}}U_{gate}(dt) \quad \text{[Equation 6]}$$

As described in FIG. 4, the quantum gate error rate $p_{g2}$ in units of the unit time and the quantum gate execution time $t_g$ may depend on the characteristics of the quantum computing system. The gate operator $U_{gate}$ (dt) depends on the unit time dt at which the quantum gate is performed, and may be an ideal (e.g., error-free) quantum gate matrix that is applied to the quantum information density matrix (or coded density matrix).

For example, the gate operator $U_{gate}(t_g)$ includes matrices corresponding to the gates of Pauli-X, Pauli-Y, Pauli-Z, controlled not CNOT, and swap SWAP, and a matrix corresponding to the selected quantum gate may be applied to the quantum information density matrix (or coded density matrix).

In operation S330, the naturally occurring quantum error in units of the unit time may be applied to the quantum information density matrix (or coded density matrix). The naturally occurring quantum error may be an error that occurs because the qubit, a unit of quantum information $|\psi\rangle$, is not completely blocked from an outside of the qubit. The naturally occurring quantum errors in units of the unit time may include an amplitude error rate γ (or intensity of amplitude error) and a phase error rate α (or intensity of phase error). The amplitude error rate γ may be defined by Equation 7.

$$\gamma=1-e^{-dt/T1} \quad \text{[Equation 7]}$$

Based on Equation 7, a probability (a degree of naturally occurring change in the amplitude of the quantum information (or the operator) when the error occurs) that the error occurs in the amplitude may be defined by Equation 8.

$$E_0^{amp} = \begin{pmatrix} 1 & \sqrt{\gamma} \\ 0 & 1 \end{pmatrix}$$ [Equation 8]

Based on Equation 8, the probability (or a degree of naturally occurring change in the amplitude of quantum information (or operator) when no error occurs) that no error occurs in amplitude may be defined by Equation 9.

$$E_1^{amp} = \begin{pmatrix} 1 & 0 \\ 0 & \sqrt{1-\gamma} \end{pmatrix}$$ [Equation 9]

The phase error rate a may be defined by Equation 10.

$$\alpha = (1 - e^{-dt/(2T_2)})/2$$ [Equation 10]

Based on Equation 10, a probability (or a degree of the naturally occurring change in the phase of the quantum information (or operator) when the error occurs) that an error occurs in the phase may be defined by Equation 11.

$$E_0^{phase} = \sqrt{\alpha} \begin{pmatrix} 1 & 0 \\ 0 & 1 \end{pmatrix}$$ [Equation 11]

Based on Equation 10, a probability (or a degree of the naturally occurring change in the phase of quantum information (or operator) when no error occurs) that no error occurs in the phase may be defined by Equation 12.

$$E_1^{phase} = \sqrt{1-\alpha} \begin{pmatrix} 1 & 0 \\ 0 & -1 \end{pmatrix}$$ [Equation 12]

Based on Equations 4 to 12, the quantum information density matrix (or coded density matrix) changed during the unit time dt may be defined by Equation 13.

$$\rho_1 = E_0 \rho_0 E^*_0 + E_1 \rho_0 E^*_1$$ [Equation 13]

In Equation 13, '$\rho_0$' is a quantum information density matrix (or coded density matrix) before the unit time dt, '$\rho_1$' may be a current quantum information density matrix (or current coded density matrix). '$E_0$' may be a quantum gate error probability, a naturally occurring quantum amplitude error probability, or a naturally occurring quantum phase error probability during the unit time dt.

'$E1$' may be a probability that the error does not occur in the quantum gate during the unit time dt, a probability that the naturally occurring quantum amplitude error does not occur, or a probability that the naturally occurring quantum phase error does not occur.

In operations S320 and S330, for the quantum information density matrix (or coded density matrix), the operation of Equation 13 may be performed three times, based on the quantum gate error, the naturally occurring quantum amplitude error, and the naturally occurring quantum phase error.

An order in which errors are applied may be based on the characteristics of the quantum computing system implemented as the target of the simulation. Alternatively, when the unit time dt is shorter than a threshold time, the order in which the errors are applied may be arbitrary or independent. The threshold time may be based on the characteristics of the quantum computing system implemented as the target of the simulation.

Exemplarily, the quantum gate error in units of the unit time may be applied based on Equation 14.

$$\rho_1 = E_0^{gate} \rho_0 E_0^{gate\,\prime} + E_1^{gate} \rho_0 E_1^{gate\,\prime}$$ [Equation 14]

Based on Equation 15, the amplitude error in units of the unit time may be applied.

$$\rho_2 = E_0^{amp} \rho_1 E_0^{amp\,\prime} + E_1^{amp} \rho_1 E_1^{amp\,\prime}$$ [Equation 15]

Based on Equation 16, the phase error in units of the unit time may be applied.

$$\rho_3 = E_0^{phase} \rho_2 E_0^{phase\,\prime} + E_1^{phase} \rho_2 E_1^{phase\,\prime}$$ [Equation 16]

When operations based on Equations 14 to 16 are performed, a state in which the error occurs probably and a state in which no error occurs probably may be mixed and expressed.

In operation S340, the quantum computing simulation system 200 may determine whether the current time t is the quantum gate execution time $t_g$, that is, the operation (or application) of the quantum gate is completed. When the operation of the quantum gate is not completed, in operation S360, the time t is increased by the unit time dt, and operations S320 and S330 may be performed again. When the operation of the quantum gate is completed, in operation S350, the quantum information density matrix (or coded density matrix) to which the selected quantum gate is applied may be returned as a result of the operation.

When the unit time dt elapses, errors are applied to the quantum information density matrix (or coded density matrix) in operations S320 and S330, and reliability may be calculated. The reliability may be calculated based on Equation 17.

$$\mathcal{F}(\rho_A, \rho_B) = \|\sqrt{\rho_A}\sqrt{\rho_B}\|_{tr}^2$$ [Equation 17]

In Equation 17, the trace function is defined by Equation 18.

$$\|\sigma\|_{tr} = \mathrm{Tr}(\sqrt{\sigma^* \sigma})$$ [Equation 18]

Equation 18 compares overlapping of different density matrices. A reliability (F) of 0 means that the two states are different, and a reliability (F) of 1 means that the two states are the same.

Figure 9:
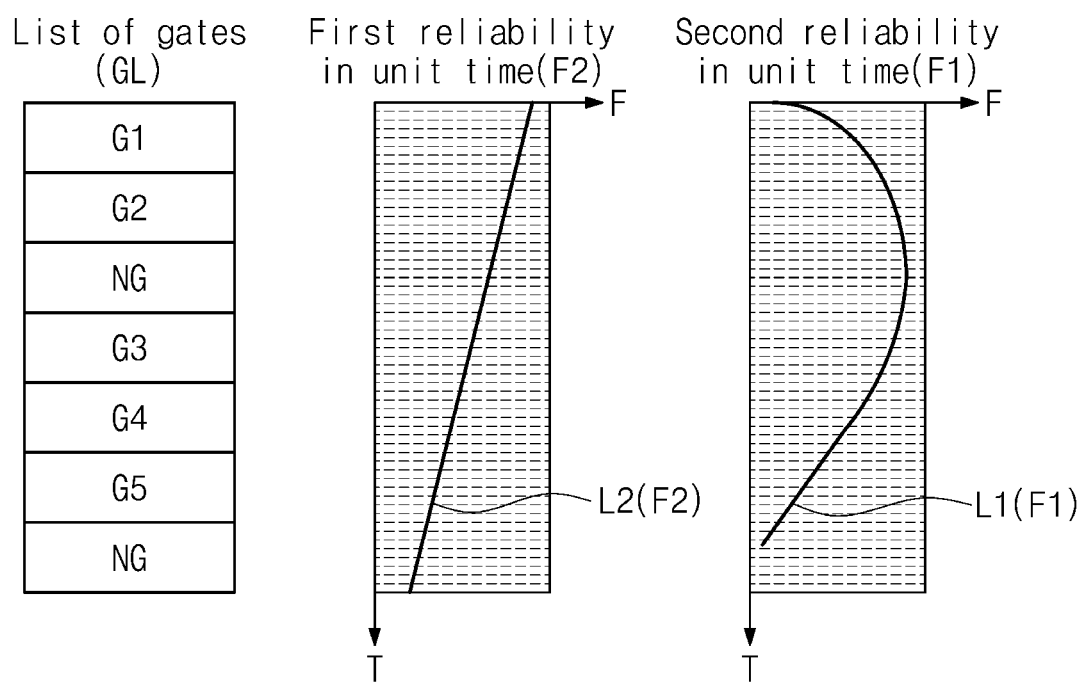
FIG. 9 is a diagram illustrating an example in which a first reliability and a second reliability are calculated in units of a unit time.

FIG. 9 is a diagram illustrating an example in which a first reliability and a second reliability are calculated in units of the unit time. Referring to FIG. 9, a list GL of the gates may include first and second quantum gates G1 and G2, no gate NG, third to fifth quantum gates G3 to G5, and no gate NG.

As a time T elapses, the first and second quantum gates G1 and G2, the no gate NG, the third to fifth quantum gates G3 to G5, and the no gate NG may be performed sequentially. While the first and second quantum gates G1 and G2, the no gate NG, the third to fifth quantum gates G3 to G5, and the no gate NG are sequentially performed, the first reliability F1 and the second reliability F2 may be calculated in units of the unit time.

In FIG. 9, the first reliability F1 is indicated by a first line L1, and the second reliability F2 is indicated by a second line L2. For example, the reliability of the quantum information density matrix may decrease linearly. The reliability when the coded density matrix is decoded may increase nonlinearly and then decrease nonlinearly.

Figure 10:
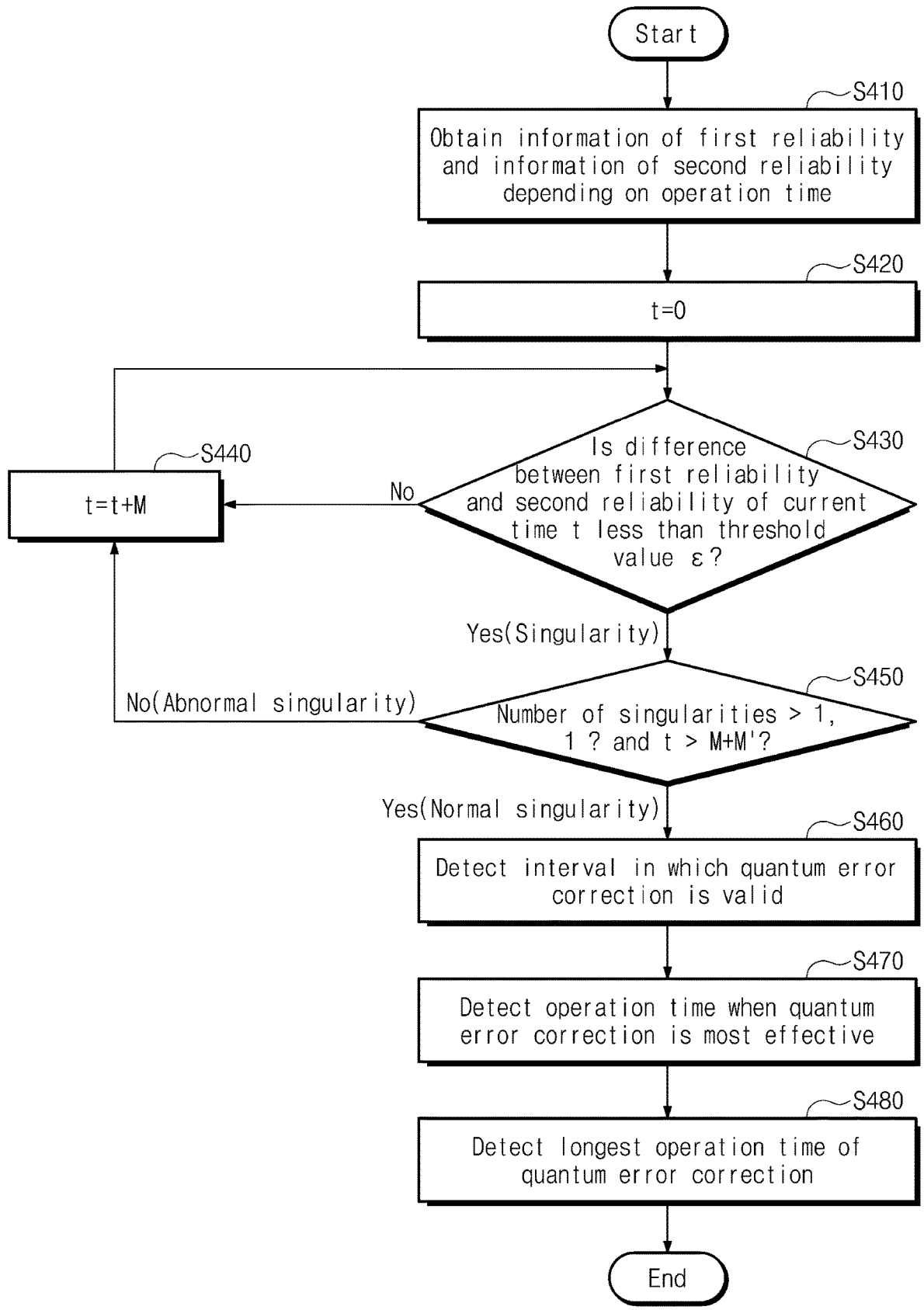
FIG. 10 is a flowchart describing an example in which an evaluation module of FIG. 2 determines an operation time.

FIG. 10 is a flowchart describing an example in which the evaluation module 250 of FIG. 2 determines an operation time (or time to perform quantum error correction decoding). Referring to FIGS. 2 and 10, in operation S410, the evaluation module 250 may receive the information of the first reliability and the information of the second reliability in units of the unit time.

In operation S420, the evaluation module 250 may initialize the variable t indicating a time to '0'. In operation S430, it may be determined whether a difference between the first reliability and the second reliability of a current time t is less than a threshold value E. When the difference between the first reliability and the second reliability is greater than the threshold value ε, the current time t may be increased by a unit time M in operation S440.

The unit time M may be equal to the unit time dt, or may be determined to be a different value from the unit time dt, based on the characteristics of the quantum computing system. After the time t is increased, operation S430 may be performed again.

When the difference between the first reliability and the second reliability is less than the threshold value ε, that is, when a value of the first reliability is similar to a value of the second reliability, it is determined that a singularity is detected, and operation S450 is performed. In operation S450, the evaluation module 250 may determine whether the number of detected singularities is greater than 1 and whether the current time t is greater than the unit time M plus an arbitrary threshold time M'. The threshold time M' may be determined based on the characteristics of the quantum computing system.

When the number of detected singularities is not greater than 1, the first singularity may be found. The evaluation module 250 may increase the time t in operation S440 and may perform the operation S430.

When the number of detected singularities is greater than 1, the second or subsequent singularities may be found. When the current time t is not greater than the unit time M plus the arbitrary threshold time M', two or more singularities may be detected for a short time after the quantum computing in the memory module 220 is started. The evaluation module 250 may identify and ignore the detected singularity as an abnormal singularity. The evaluation module 250 may increase the time t in operation S440 and may perform operation S430.

When the number of detected singularities is greater than 1, and the current time t is greater than the unit time M plus the arbitrary threshold time M', the evaluation module 250 may identify the detected singularity as a normal singularity.

Thereafter, operation S460 may be performed. When operations S430 and S450 are performed, the evaluation module 250 may detect two normal singularities.

In operation S460, the evaluation module 250 may detect an interval in which the quantum error correction is valid from two singularities. In operation S470, the evaluation module 250 may detect the operation time when quantum error correction is most effective. In operation S480, the evaluation module 250 may detect a longest operation time of the quantum error correction. The evaluation module 250 may calculate the operation time of the memory module 220, based on the detected interval and time.

For example, when the quantum computing system is implemented except for the evaluation module 250, the evaluation module 250 may determine whether the error correction module 240 performs the quantum error correction decoding after the memory module 220 performs operations of several quantum gates.

Figure 11:
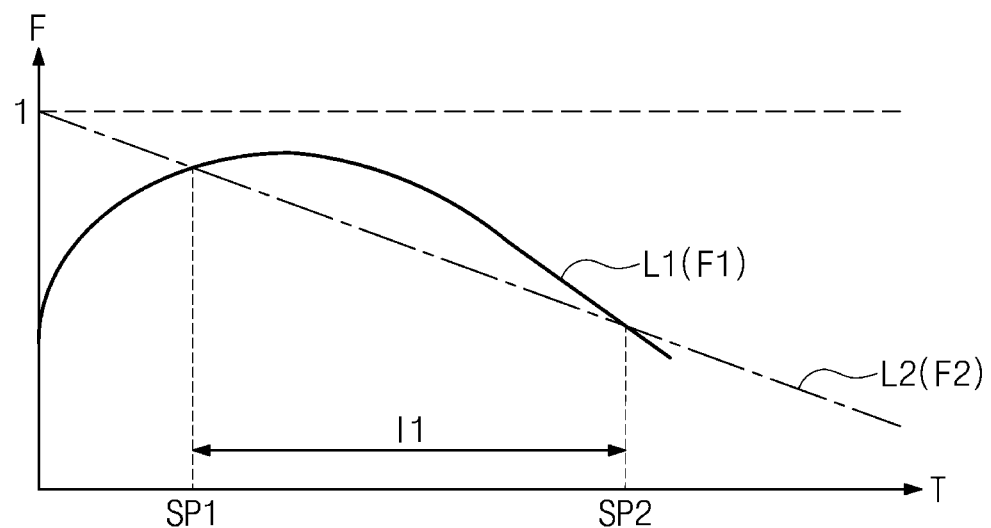
FIG. 11 is a graph illustrating an example in which singularities are detected from a first reliability and a second reliability.

FIG. 11 is a graph illustrating an example in which singularities are detected from a first reliability F1 and a second reliability F2. In FIG. 11, a horizontal axis indicates time T, and a vertical axis indicates reliability F.

Referring to FIGS. 10 and 11, a first singularity SP1 and a second singularity SP2 may be detected at a time when the first line L1 of the first reliability F1 and the second line L2 of the second reliability F2 intersect. The first interval I1 between the first singularity SP1 and the second singularity SP2 may correspond to an interval in which the quantum error correction is valid (operation S460), for example, an interval in which the quantum error correction increases reliability.

Figure 12:
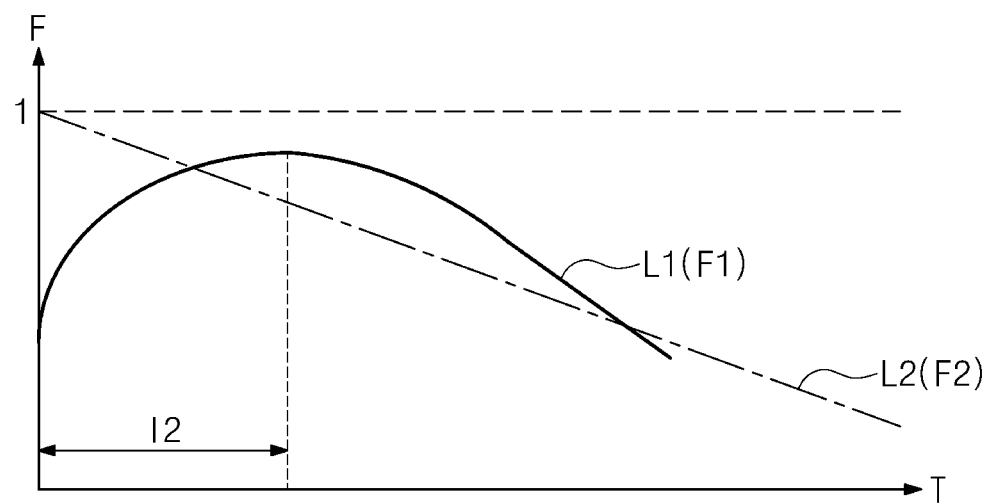
FIG. 12 is a graph illustrating an example in which an operation time in which quantum error correction is most effective is detected from a first reliability and a second reliability.

FIG. 12 is a graph illustrating an example (operation S470) in which an operation time in which quantum error correction is most effective is detected from a first reliability F1 and a second reliability F2. In FIG. 12, a horizontal axis indicates time T, and a vertical axis indicates reliability F.

Referring to FIGS. 10 and 12, when the first line L1 of the first reliability F1 has a maximum value, the quantum error correction may show the best performance. Therefore, the second interval I2 from when the quantum operation starts to the time when the first line L1 of the first reliability F1 has the maximum value may be the most effective interval of the quantum error correction.

Actually, since the quantum operation is performed in units of quantum gates, when the time is divided by the execution time $t_g$ of each of the quantum gates, a time at which a boundary between the execution times of the quantum gates is closest to the time when the first line L1 of the first reliability F1 has the maximum value may be detected as the most effective operation time.

Figure 13:
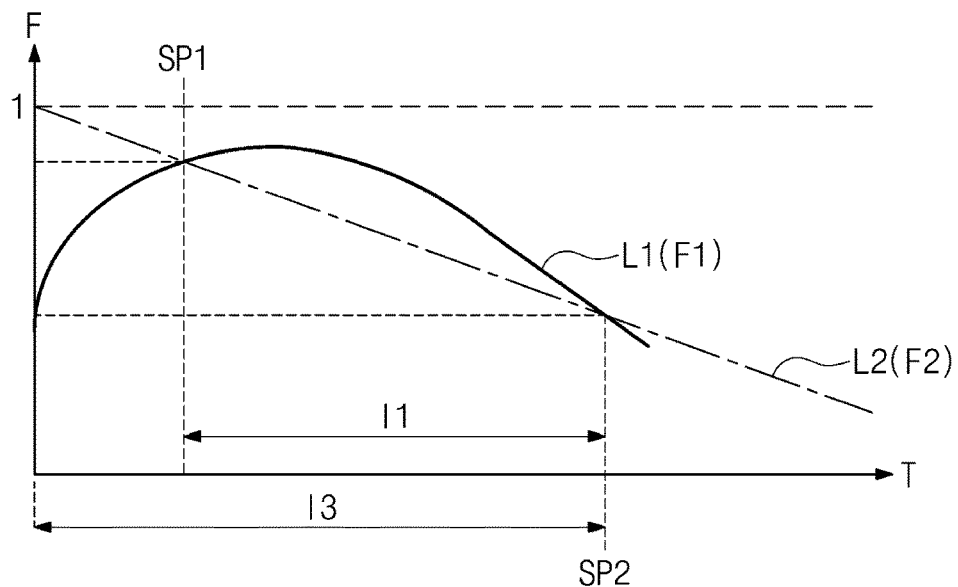
FIG. 13 is a graph illustrating an example in which a longest operation time of a quantum error correction is detected from a first reliability and a second reliability.

FIG. 13 is a graph illustrating an example (operation S480) in which a longest operation time of a quantum error correction is detected from a first reliability F1 and a second reliability F2. In FIG. 13, a horizontal axis indicates time T, and a vertical axis indicates reliability F.

Referring to FIGS. 10 and 13, a third interval I3 from when the quantum operation starts to the second singularity SP2 may be the longest operation time for which the quantum error correction is effective. An end time of the operation time may be determined in the first interval I1 between the first singularity SP1 and the second singularity SP2. The evaluation module 250 may determine the end time of the operation time by considering an effect of the quantum error correction, a length of the operation time, and the characteristics and purpose of the quantum computing system.

For example, the evaluation module 250 may determine the accumulative operation time of the quantum gates in which the accumulative operation time belongs to the first interval I1 between the first and second singularities SP1 and SP2 among two or more quantum gates, as the operation time.

Figure 14:
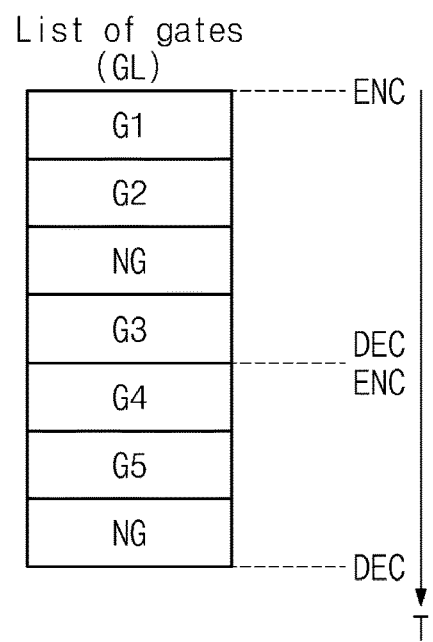
FIG. 14 is a diagram describing an example in which an operation time is determined, and a quantum operation is performed by a quantum computing system.

FIG. 14 is a diagram describing an example in which an operation time is determined, and a quantum operation is performed by a quantum computing system. Referring to FIGS. 2 and 14, for example, the operation time may be determined up to a third quantum gate G3.

When the quantum operation is started, the coding module 210 may perform quantum error correction coding ENC on the quantum information |ψ⟩.

The memory module 220 may sequentially perform quantum operations of a first quantum gate G1, a second quantum gate G2, the no gate NG, and the third quantum gate G3 with respect to the coded quantum information |ψ⟩.

Thereafter, the error correction module 240 may correct an error by performing quantum error correction decoding DEC on the quantum information |ψ⟩ output from the memory module 220. The coding module 210 may perform the quantum error correction coding ENC on the decoded quantum information |ψ⟩.

The memory module 220 may sequentially perform quantum operations of a fourth quantum gate G4, a fifth quantum gate G5, and the no gate NG on the coded quantum information |ψ⟩. Thereafter, the error correction module 240 may correct an error by performing quantum error correction decoding DEC on the quantum information |ψ⟩ output from the memory module 220.

In the above-described embodiments, components according to the inventive concept are described using terms such as first, second, third, etc.

However, terms such as first, second, and third are used to distinguish components from one another, and do not limit the inventive concept. For example, terms such as first, second, third, etc. do not imply numerical meaning in any order or in any form.

In the above-described embodiments, components according to embodiments of the inventive concept are illustrated using blocks. The blocks may be implemented as various hardware devices such as an Integrated Circuit (IC), an Application Specific IC (ASIC), a Field Programmable Gate Array (FPGA), and a Complex Programmable Logic Device (CPLD), a firmware running on hardware devices, software such as an application, or a combination of hardware devices and software. Further, the blocks may include circuits composed of semiconductor elements in the IC or circuits registered as Intellectual Property (IP).

According to the inventive concept, a reliability of a quantum information density matrix is compared with a reliability of a coded quantum information density matrix in units of the unit time. Therefore, an appropriate time that performs quantum error correction decoding may be calculated.

The contents described above are specific embodiments for implementing the inventive concept. The inventive concept may include not only the embodiments described above but also embodiments in which a design is simply or easily capable of being changed. In addition, the inventive concept may also include technologies easily changed to be implemented using embodiments. Therefore, the scope of the inventive concept is not limited to the described embodiments but should be defined by the claims and their equivalents.

What is claimed is:

1. A method of simulating, by a non-quantum computer, a quantum computing system having an error correction function, the method comprising:
   generating, by the non-quantum computer, a quantum information density matrix;
   generating, by the non-quantum computer, a coded density matrix by performing quantum error correction coding on the quantum information density matrix;
   applying, by the non-quantum computer, simulated quantum computing to the coded density matrix and calculating a change in a first reliability of the coded density matrix;
   applying, by the non-quantum computer, the simulated quantum computing to the quantum information density matrix and calculating a change in a second reliability of the quantum information density matrix;
   determining, by the non-quantum computer, a unit time that calculates error rates and reliabilities of the coded density matrix and the quantum information density matrix;
   determining, by the non-quantum computer, an operation time of the simulated quantum computing, based on the unit time and the change in the first reliability and the change in the second reliability; and
   performing, by the non-quantum computer, quantum error correction in the simulated quantum computing based on the operation time,
   wherein the simulated quantum computing includes an operation of two or more quantum gates on coded quantum information corresponding to the quantum information density matrix,
   wherein the performing quantum error correction includes
      performing, by the non-quantum computer, quantum error correction decoding on the coded quantum information, and
      applying, by the non-quantum computer, a quantum operation opposite to each of types of errors that are determined based on the operation time, and
   wherein the determining the unit time includes shortening the unit time to improve at least one of a resolution, an accuracy, or a reliability of time for error correction decoding that is performed by the simulated quantum computing system.

2. The method of claim 1, wherein the calculating of the change in the first reliability includes:
   calculating the change in the first reliability of the coded density matrix in units of the unit time.

3. The method of claim 2,
   wherein the unit time is less than a respective operation time of the quantum gates.

4. The method of claim 2, wherein the calculating of the change in the first reliability of the coded density matrix in units of the unit time includes:
   applying an error of the unit time by the simulated quantum computing to the coded density matrix; and
   applying a naturally occurring quantum error of the unit time to the coded density matrix.

5. The method of claim 4, wherein the applying of the error of the unit time by the simulated quantum computing to the coded density matrix includes:
   applying an error in an amplitude of the unit time by the simulated quantum computing to the coded density matrix; and
   applying an error in a phase of the unit time by the simulated quantum computing to the coded density matrix.

6. The method of claim 4, wherein the applying of the naturally occurring quantum error of the unit time to the coded density matrix includes:
   applying an error in a naturally occurring amplitude of the unit time to the coded density matrix; and
   applying an error in a naturally occurring phase of the unit time to the coded density matrix.

7. The method of claim 1, wherein the calculating of the change in the second reliability includes:
   calculating the change in the second reliability of the quantum information density matrix in units of a unit time.

8. The method of claim 1, wherein the determining of the operation time of the simulated quantum computing, based on the change in the first reliability and the change in the second reliability includes:
   detecting singularities based on a change in a difference between the first reliability and the second reliability; and
   determining the operation time based on the singularities.

9. The method of claim 8, wherein the detecting of the singularities includes:
detecting at least two singularities in which the difference between the first reliability and the second reliability is less than a threshold.

10. The method of claim 8, wherein the detecting of the singularities further includes:
when a second singularity is detected after a first singularity is detected, ignoring the second singularity when a time difference between the first singularities and the second singularities is less than or equal to a threshold.

11. The method of claim 8, wherein the determining of the operation time includes:
determining a time for which the first reliability is highest among the singularities as the operation time.

12. The method of claim 8, wherein the determining of the operation time includes:
determining a time belonging to the singularities as the operation time.

13. The method of claim 8, wherein the detecting of the singularities includes:
comparing of the change in the first reliability and the change in the second reliability in units of a reference operation time, and detecting the singularities, based on the comparison in units of the reference operation time.

14. The method of claim 13,
wherein the determining of the operation time includes;
determining an accumulative operation time of the quantum gates in which the accumulative operation time belongs to a time period between the singularities, among the two or more quantum gates, as the operation time.

15. A method of simulating, by a non-quantum computer, a quantum computing system having an error correction function, the method comprising:
generating, by the non-quantum computer, a quantum information density matrix;
applying, by the non-quantum computer, a selected one quantum gate to the quantum information density matrix in units of a unit time;
sequentially selecting, by the non-quantum computer, quantum gates and applying the selected quantum gates to the quantum information density matrix in units of the unit time; and
calculating, by the non-quantum computer, a change in reliability of the unit time of the quantum information density matrix as the quantum gates are applied; and
performing, by the non-quantum computer, quantum error correction in the simulated quantum computing system based on the calculated change in reliability,
wherein the performing quantum error correction includes
performing, by the non-quantum computer, quantum error correction decoding on coded quantum information corresponding to the quantum information density matrix,
applying, by the non-quantum computer, a quantum operation opposite to each of types of errors that are determined based on the calculated change in reliability; and
wherein the applying the selected one quantum gate includes shortening the unit time to improve at least one of a resolution, an accuracy, or a reliability of time for error correction decoding that is performed by the simulated quantum computing system.

16. The method of claim 15, further comprising:
generating a coded density matrix by performing error correction coding on the quantum information density matrix;
sequentially selecting the quantum gates and applying the selected quantum gate to the coded density matrix in units of the unit time; and
calculating a change in a decoded reliability in units of the unit time of the coded density matrix as the quantum gates are applied.

17. The method of claim 16, further comprising:
determining a time at which decoding is performed on the coded density matrix, based on the change in the reliability and the change in the decoded reliability.

18. The method of claim 16, wherein the time is determined based on a unit of the operation time of each of the quantum gates.

19. A quantum computing simulation system comprising a non-quantum processor configured to implement the following modules to simulate a quantum computing system having an error correction function, the modules including instructions executable by the non-quantum processor:
a coding module configured to, when executed by the non-quantum processor, receive quantum information and quantum error correction coding information, and to perform error correction coding on the quantum information, based on the quantum error correction coding information to generate coded quantum information;
a memory module configured to, when executed by the non-quantum processor, perform simulated quantum computing by applying quantum gates to the coded quantum information in units of a unit time and by applying the quantum gates to the quantum information in units of the unit time;
an error correction module configured to, when executed by the non-quantum processor, generate decoded quantum information by performing error correction on the coded quantum information to which the quantum gates are applied, in units of the unit time; and
an evaluation module configured to, when executed by the non-quantum processor, calculate a change in a first reliability of the decoded quantum information in units of the unit time, and to calculate a change in a second reliability of the quantum information to which the quantum gates are applied, in units of the unit time;
wherein the evaluation module is further configured to, when executed by the non-quantum processor, determine an operation time to which the quantum gates are applied to the coded quantum information, based on a change in a difference between the first reliability and the second reliability;
wherein the performing quantum error correction includes
performing, by the non-quantum processor, quantum error correction decoding on the coded quantum information, and
applying, by the non-quantum processor, a quantum operation opposite to each of types of errors that are determined based on the operation time; and
wherein the determining the operation time includes shortening the unit time to improve at least one of a resolution, an accuracy, or a reliability of time for error correction decoding that is performed by the quantum computing simulation system.

* * * * *